(12) United States Patent
Shao et al.

(10) Patent No.: US 12,259,247 B2
(45) Date of Patent: Mar. 25, 2025

(54) METHODS FOR MANAGING CLEANING ROUTES IN SMART CITIES, INTERNET OF THINGS SYSTEMS, AND STORAGE MEDIUMS

(71) Applicant: CHENGDU QINCHUAN IOT TECHNOLOGY CO., LTD., Sichuan (CN)

(72) Inventors: Zehua Shao, Chengdu (CN); Yuefei Wu, Chengdu (CN); Junyan Zhou, Chengdu (CN); Yaqiang Quan, Chengdu (CN); Xiaojun Wei, Chengdu (CN)

(73) Assignee: CHENGDU QINCHUAN IOT TECHNOLOGY CO., LTD., Chengdu (CN)

(*) Notice: Subject to any disclaimer, the term of this patent is extended or adjusted under 35 U.S.C. 154(b) by 425 days.

(21) Appl. No.: 18/045,155

(22) Filed: Oct. 8, 2022

(65) Prior Publication Data

US 2023/0057564 A1    Feb. 23, 2023

(30) Foreign Application Priority Data

Aug. 30, 2022  (CN) .......................... 202211044509.7

(51) Int. Cl.
| | |
|---|---|
| *G01C 21/34* | (2006.01) |
| *G01C 21/36* | (2006.01) |
| *G06Q 10/04* | (2023.01) |
| *G06V 10/70* | (2022.01) |
| *G06V 20/10* | (2022.01) |

(Continued)

(52) U.S. Cl.
CPC ..... *G01C 21/3407* (2013.01); *G01C 21/3602* (2013.01); *G06Q 10/04* (2013.01); *G06V 10/70* (2022.01); *G06V 20/10* (2022.01); *G06V 20/50* (2022.01); *G16Y 40/60* (2020.01)

(58) Field of Classification Search
CPC ............ G01C 21/3407; G01C 21/3602; G06V 10/70; G06V 20/10; G06V 20/50; G06Q 10/04; G16Y 40/60
USPC ...................................................... 382/103
See application file for complete search history.

(56) References Cited

U.S. PATENT DOCUMENTS

| | | | |
|---|---|---|---|
| 11,776,409 B2 * | 10/2023 | Shao ...................... | G08G 1/202 |
| | | | 701/533 |
| 2018/0035606 A1 * | 2/2018 | Burdoucci ........... | A01D 34/008 |
| 2018/0181091 A1 * | 6/2018 | Funk ....................... | G08G 1/133 |

(Continued)

*Primary Examiner* — Michael R Neff
(74) *Attorney, Agent, or Firm* — METIS IP LLC

(57) ABSTRACT

The disclosure provides a method for managing a cleaning route in a smart city, an Internet of Things system and storage medium. The method includes: obtaining target information of a target area within a preset time period based on an object platform; sending the target information to a management platform through a sensor network platform; determining a cleaning route of the target area by processing the target information of the target area based on the management platform, including: determining an estimated amount of fallen leaves of each section of road in the target area; determining an estimated falling range of fallen leaves of each section of road in the target area; determining a cleaning difficulty evaluation value of each section of road based on the estimated amount of fallen leaves and the estimated falling range; and determining a cleaning route based on the cleaning difficulty evaluation value.

20 Claims, 6 Drawing Sheets

(51) Int. Cl.
    *G06V 20/50*    (2022.01)
    *G16Y 40/60*    (2020.01)

(56) References Cited

U.S. PATENT DOCUMENTS

| | | | |
|---|---|---|---|
| 2018/0181095 A1* | 6/2018 | Funk | G05B 19/042 |
| 2019/0020530 A1* | 1/2019 | Au | H04W 72/21 |
| 2022/0187841 A1* | 6/2022 | Ebrahimi Afrouzi | G05D 1/0274 |
| 2023/0300623 A1* | 9/2023 | Barnes | H04W 12/72 |
| | | | 455/411 |
| 2023/0394973 A1* | 12/2023 | Shao | G06Q 10/063 |
| 2023/0394974 A1* | 12/2023 | Shao | G06Q 10/047 |

* cited by examiner

300

310 — Sending a target information obtaining instruction of the target area through sensor network sub-platforms corresponding to the target area 320 — Obtaining the target information of the target area within the preset time period based on the object platform in response to the target information obtaining instruction, and sending the target information of the target area to the sensor network sub-platforms 330 — Sending the target information of the target area to management sub-platforms corresponding to the target area through the sensor network sub-platforms 340 — Determining a cleaning route of the target area by processing the target information of the target area based on the management sub-platforms 350 — Sending the cleaning route of the target area to the service sub-platforms corresponding to the management sub-platforms through the management sub-platforms corresponding to the target area 360 — Receiving the cleaning route of the target area through the service sub-platforms, and summarizing the cleaning route of the target area to the general database 370 — Obtaining the cleaning route of the city by summarizing the cleaning route of each target area in the city based on the general database, and sending the cleaning route to the user platform

FIG. 3

METHODS FOR MANAGING CLEANING ROUTES IN SMART CITIES, INTERNET OF THINGS SYSTEMS, AND STORAGE MEDIUMS

This application claims priority to Chinese Patent Application No. 202211044509.7, filed on Aug. 30, 2022, the entire contents of which are hereby incorporated by reference.

TECHNICAL FIELD

The disclosure relates to the technical field of city cleaning, in particular to methods for managing cleaning routes in smart cities, and Internet of Things systems, and storage mediums.

BACKGROUND

With the development of science and technology and the advancement of smart cities, more and more public service devices have become intelligent. However, in terms of city road cleaning, it is still the road administration department that hires cleaning workers to complete city road cleaning in the form of zoning. This method requires a lot of sanitation workers, which increases the cost of sanitation and the way of cleaning in the form of zoning leads to the problems such as high sanitation labor intensity, long working hours, and low cleaning efficiency. Therefore, it is necessary to provide a method and a system for managing a cleaning route in a smart city.

SUMMARY

One or more embodiments of the disclosure provide a method for managing a cleaning route in a smart city. The method is implemented based on an Internet of Things system for managing a cleaning route in a smart city. The Internet of Things system for managing the cleaning route in the smart city includes a management platform, a sensor network platform, and an object platform. The method includes: obtaining target information of a target area within a preset time period based on the object platform, the target information including at least one of road monitoring information, weather information, and sidewalk tree information; sending the target information of the target area to the management platform through the sensor network platform; determining a cleaning route of the target area by processing the target information of the target area based on the management platform, including: determining an estimated amount of fallen leaves of each section of road in the target area according to the target information; determining an estimated falling range of fallen leaves of each section of road in the target area according to the target information and the estimated amount of fallen leaves; determining a cleaning difficulty evaluation value of each section of road based on the estimated amount of fallen leaves and the estimated falling range of each section of road; and determining a cleaning route based on the cleaning difficulty evaluation value of each section of road.

One of the embodiments of the disclosure provides an Internet of Things system for managing a cleaning route in a smart city, comprising a management platform, a sensor network platform, and an object platform. The object platform is configured to obtain the target information of the target area within the preset time period based on the object platform, the target information including at least one of the monitoring information, the weather information, and the sidewalk tree information. The sensor network platform is configured to send the target information of the target area to the management platform. The management platform is configured to determine the cleaning route of the target area by processing the target information of the target area. The management platform is further configured to: determine an estimated amount of fallen leaves of each section of road in the target area according to the target information; determine an estimated falling range of fallen leaves of each section of road in the target area according to the target information and the estimated amount of fallen leaves; determine a cleaning difficulty evaluation value of each section of road based on the estimated amount of fallen leaves and the estimated falling range of each section of road; and determine a cleaning route based on the cleaning difficulty evaluation value of the each section of road.

One or more embodiments of the disclosure provide a non-transitory computer readable storage medium. The storage medium stores computer instructions, and when the computer instructions are executed by a processor, the method for managing the cleaning route in the smart city is implemented.

BRIEF DESCRIPTION OF THE DRAWINGS

This disclosure may be further explained in the form of exemplary embodiments, which may be described in detail by means of accompanying drawings. These embodiments are not restrictive, in which the same numbering indicates the same structure, wherein:

FIG. 3 is an exemplary flowchart of a method for determining a cleaning route based on a plurality of target areas shown according to some embodiments of this disclosure;

DETAILED DESCRIPTION

Figure 1:
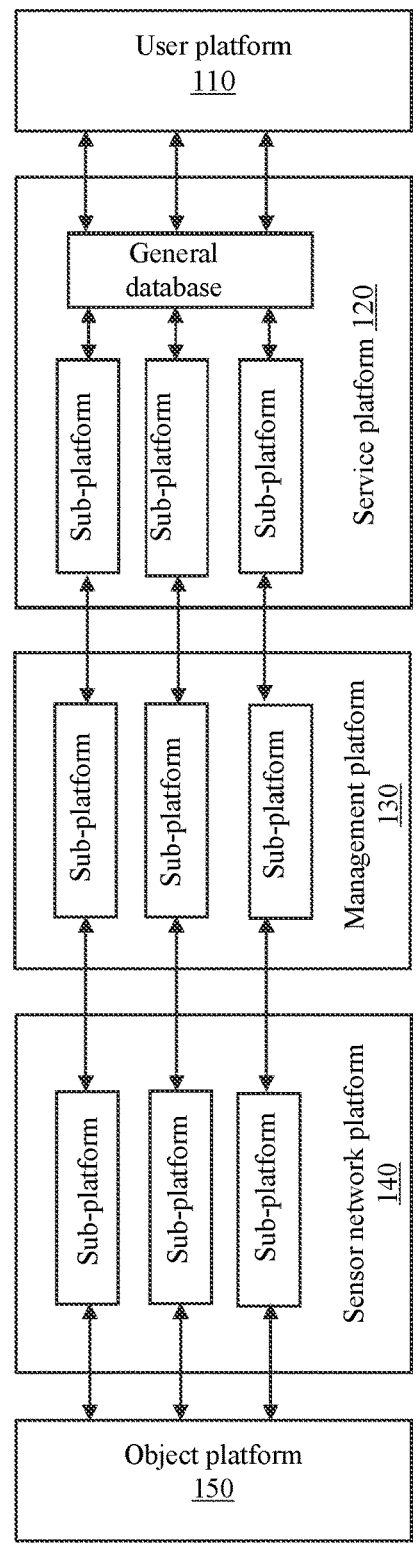
FIG. 1 is an exemplary structure diagram of an Internet of Things system for managing a cleaning route in a smart city shown according to some embodiments of this disclosure.

In order to more clearly explain the technical scheme of the embodiments of this disclosure, a brief description of the accompanying drawings required for the embodiment description is given below. Obviously, the accompanying drawings below are only some examples or embodiments of this disclosure, and it is possible for ordinary technicians skilled in the art to apply this disclosure to other similar scenarios according to these accompanying drawings without creative effort. Unless obviously obtained from the context or the context illustrates otherwise, the same numeral in the drawings refers to the same structure or operation.

It should be understood that the "system", "device", "unit" and/or "module" used in this article are a method used to distinguish different components, elements, parts, portions or assemblies of different levels. However, if other words can serve the same purpose, the words may be replaced by other expressions.

As shown in this disclosure and claims, the words "one", "a", "a kind" and/or "the" are not specially singular but may include the plural unless the context expressly suggests otherwise. In general, the terms "comprise" and "include" imply the inclusion only of clearly identified steps and elements that do not constitute an exclusive listing. A method or equipment may also include other steps or elements.

Flowcharts are used in this disclosure to illustrate the operation implemented according to the system of the embodiments of this disclosure. It should be understood that the previous or subsequent operations may not be accurately implemented in order. Instead, each step may be processed in reverse order or simultaneously. Meanwhile, other operations may also be added to these processes, or a certain step or several steps may be removed from these processes.

FIG. 1 is an exemplary structure diagram of an Internet of Things system for managing a cleaning route in a smart city shown according to some embodiments of this disclosure.

As shown in FIG. 1, the Internet of Things system 100 for managing the cleaning route in the smart city may include a user platform 110, a service platform 120, a management platform 130, a sensor network platform 140, and an object platform 150.

In some embodiments, the Internet of Things system 100 for managing the cleaning route in the smart city may be applied to city appearance management (such as planning the cleaning route) and other application scenarios. For example, the Internet of Things system 100 for managing the cleaning route in the smart city may be applied to daily cleaning route planning of cities (such as the City of Chicago, New York City and other municipal administrative units). In some embodiments, a city may include a plurality of target areas. The Internet of Things system 100 for managing the cleaning route in the smart city may obtain target information of the target area within a preset time period, and determine the cleaning route of the target area based on processing of the target information.

It should be noted that the above scenarios are only examples and do not restrict the specific application scenarios of the Internet of Things system 100 for managing the cleaning route in the smart city. The technicians skilled in the art may apply the Internet of Things system 100 for managing the cleaning route in the smart city to any other suitable scenarios on the basis of what is disclosed in the embodiments.

The following is a detailed description of the Internet of Things system 100 for managing the cleaning route in the smart city.

The user platform 110 may be a user-oriented service interface and is configured as terminal equipment. In some embodiments, the user platform 110 may receive information from a user. For example, the user platform 110 may receive a cleaning route query instruction from a user. In some embodiments, the user platform 110 may feed the cleaning route of the city back to the user.

In some embodiments, the user platform 110 may interact with the service platform 120. For example, the user platform 110 may send the cleaning route query instruction to the service platform 120; As another example, the user platform 110 may receive a city cleaning route uploaded by the service platform 120.

The service platform 120 may be a platform for providing input and output services to the user and is configured as a first server. In some embodiments, the service platform 120 may store data (such as the cleaning route) for interaction with the user.

In some embodiments, the service platform 120 may interact with the user platform 110 and the management platform 130. For example, the service platform 120 may store the cleaning route generated by the storage management platform 130 in a centralized manner, and feed the cleaning routes back to the user through the user platform 110.

The management platform 130 may refer to an Internet of Things platform that plans and coordinates the connection and collaboration between various functional platforms, and provides perception management and control management. In some embodiments, the management platform 130 may be configured as a second server. In some embodiments, the management platform 130 may be main execution equipment of the method for managing the road cleaning route in the smart city. For example, the management platform 130 may determine the cleaning route in the target area by processing the target information of each target area.

In some embodiments, the management platform 130 may interact with the service platform 120 and the sensor network platform 140. For example, the management platform 130 may receive the target information through the sensor network platform 140, determine the cleaning route based on the target information and send the cleaning route to the service platform 140.

The sensor network platform 140 may be a platform for interactive connection between the management platform and the object platform. In some embodiments, the sensor network platform 140 is configured as a communication network and a gateway, and each sensor network sub-platform may be configured with an independent gateway.

In some embodiments, the sensor network platform 140 may interact with the management platform 130 and the object platform 150. For example, the sensor network platform 140 may send a target information obtaining instruction to the object platform 150 to obtain the target information, and then forward the target information to the management platform 130.

The object platform 150 may be a functional platform for perception information generation and final implementation of control information. In some embodiments, the object platform 150 may be configured as a functional platform composed of at least one of related monitoring equipment (such as camera equipment). The related monitoring equipment may include cameras for obtaining road monitoring information.

In some embodiments, the object platform 150 may interact with the sensor network platform 140. For example, the object platform 150 may obtain the target information and send the target information out through the sensor network platform 140.

In some embodiments, considering that the implementation objects (such as cities) of the method for managing the cleaning route in the smart city may have a large area, in order to facilitate information processing, the implementation objects may be divided into a plurality of target areas, and a distributed Internet of Things system for managing the cleaning route in the smart city may be constructed according to the target area. That is, a plurality of platforms in the Internet of Things system for managing the cleaning route in the smart city may include sub-platforms corresponding to the target areas.

In some embodiments, the service platform 120 may adopt a front distributed arrangement. The front distributed arrangement adopted by the service platform 120 refers that the service platform 120 is provided with a general database and a plurality of sub-platforms (including their own databases), and a plurality of sub-platforms store and process relevant information of each target area respectively. The general database may be used for summarizing and processing data of the service sub-platforms, and each service sub-platform may interact with the general database and other sub-platforms (such as management sub-platforms) corresponding to the corresponding target areas.

In some embodiments, the management platform 130 may adopt an independent arrangement. The independent arrangement adopted by the management platform 130 refers that the management platform 130 uses different management sub-platforms for data storage, data processing and/or data transmission for each target area, the management sub-platforms are divided according to the target areas, and the management sub-platform may interact with other sub-platforms (such as sensor network sub-platforms) corresponding to the corresponding target areas.

In some embodiments, the sensor network platform 140 may adopt an independent arrangement. The independent arrangement adopted by the sensor network platform 140 may refer that the network equipment such as a network and a gateway in each target area are regarded as a sensor network sub-platform of the target area.

In some embodiments, for each target area, a plurality of sub-platforms corresponding to the same target area may interact. For example, the sensor network sub-platform corresponding to the target area may send the target information to the management sub-platform corresponding to the target area. The management sub-platform corresponding to the target area may send a calculated cleaning route of the target area to the service sub-platform corresponding to the target area.

Figure 2:
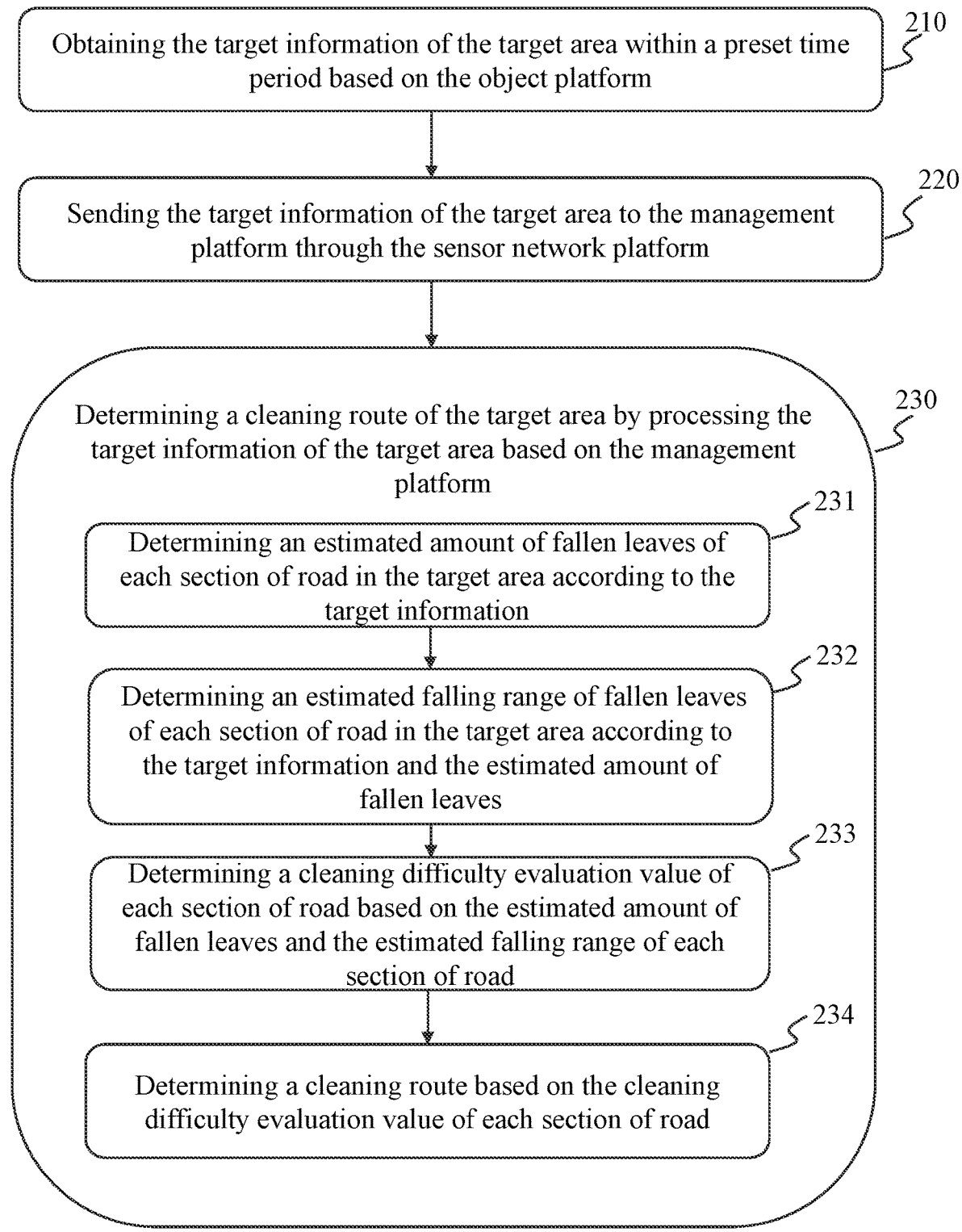
FIG. 2 is an exemplary flowchart of a method for managing a cleaning route in a smart city shown according to some embodiments of this disclosure.

FIG. 2 is an exemplary flowchart of the method for managing the cleaning route in the smart city shown according to some embodiments of this disclosure. In some embodiments, a process 200 may be implemented based on the Internet of Things system 100 for managing the cleaning route in the smart city.

As shown in FIG. 2, the process 200 includes the following steps.

Step 210, obtaining the target information of the target area within a preset time period based on the object platform, the target information including at least one of road monitoring information, weather information, and sidewalk tree information. In some embodiments, step 210 may be implemented by the object platform 150. For more contents of the object platform 150, please refer to FIG. 1 and its related descriptions.

The target area may be at least part of the implementation objects of the method for managing the cleaning route in the smart city. For example, when the city is subject to city appearance management (such as planning the cleaning route), the target area may be each administrative division under the jurisdiction of the city (such as Joliet, Naperville, and other areas in the city of Chicago). In some embodiments, the target area may also be determined according to the actual needs of a user. For example, the user may designate the target area in a map.

It should be noted that the process 200 mainly involves the determination of the cleaning route of the target area. For the related contents of the city cleaning route, please refer to FIG. 3 and its related descriptions.

The preset time period may be a time period during which the object platform performs data collection. In some embodiments, the preset time period may be related to the implementation time of the method for managing the cleaning route in the smart city. The preset time period may be a time period (e.g., 1 hour, 2 hours, etc.) before the implementation of the method for managing the cleaning route in the smart city. For example, city cleaning is performed at 6, 11 and 18 o'clock in the city every day, and the preset time period may be a time period (e.g., 1 hour, 2 hours, etc.) before each time of city cleaning. As another example, the preset time period may be a time period from the historical moment of implementing the method for managing the cleaning route in the smart city last time to the current moment.

The target information may be information capable of directly or indirectly reflecting the degree of cleanliness (such as an amount of fallen leaves, a falling range of fallen leaves, etc.) of the target area. For example, target information may include at least one of the road monitoring information, the weather information, and the sidewalk tree information.

The road monitoring information may be the monitoring information of each section of road in the target area, which may reflect the degree of cleanliness of each section of road surface (such as the amount of fallen leaves on the road surface). In some embodiments, the road monitoring information may be obtained through monitoring equipment arranged in the object platform of each section of road in the object platform.

The weather information may reflect the related information of weather conditions in the target area. For example, the weather information may include temperature, wind power, wind direction, air humidity and other related information. In some embodiments, the weather information may be obtained through a weather database (such as related databases of the Meteorological Bureau). In some embodiments, the object platform may also include meteorological sensors (such as meteorological balloons, meteorological satellites, etc.), and the weather information may be obtained through the meteorological sensors.

The sidewalk tree information may reflect the situation of sidewalk trees in each section of road in the target area, and the sidewalk trees may refer to trees planted on both sides of the road. The sidewalk tree information may include the information on the type, age, and denseness of leaves of each sidewalk tree. In some embodiments, the sidewalk tree information may be obtained through a city database (such as the related database of the Urban Planning Bureau and the Environmental Protection Bureau).

In some embodiments, the sidewalk tree information may also be determined by the road monitoring information obtained by the monitoring equipment of each section of road, i.e., a sidewalk tree image may be determined first based on the road monitoring information; and then the sidewalk tree image is processed based on an image recognition model to determine the sidewalk information, and the sidewalk image may refer to a monitoring image of a sidewalk tree part in the road monitoring information. The image recognition model may be a trained machine learning model. For more contents about image recognition model, please refer to FIG. 4 and its related descriptions.

In some embodiments, the road monitoring information may be processed according to a preset rule to determine the sidewalk tree image. For example, the staff may designate the area where the sidewalk trees locate in the picture in advance according to the road monitoring information, and extract the monitoring information of the area as the sidewalk tree image according to the area designated by the staff when determining the sidewalk tree image. As another example, the road monitoring information may be processed to determine the sidewalk tree image using the sidewalk trees as recognition targets based on a target recognition algorithm.

Step 220, sending the target information of the target area to the management platform through the sensor network platform. In some embodiments, step 220 may be implemented through the sensor network platform 140. For more contents about the sensor network platform 140, please refer to FIG. 1 and its related descriptions.

In some embodiments, the target information obtained by the object platform may be sent to the sensor network platform in real time, and the sensor network platform forwards the target information to the corresponding management platform in real time. In some embodiments, the sensor network platform may cache the target information obtained by the object platform to determine the target information within the preset time period and send the target information to the corresponding management platform.

Step 230, determining a cleaning route of the target area by processing the target information of the target area based on the management platform. In some embodiments, step 230 may be implemented by the management platform 130. For more contents about the management platform 130, please refer to FIG. 1 and its related descriptions.

The cleaning route may refer to a cleaning order of each section of road in the target area during cleaning, the target area may include a plurality of cleaning routes, and cleaning each section of road along each cleaning route may complete the cleaning of the target area.

In some embodiments, the cleaning route may be determined according to the preset rule and the target information and adjusted according to the actual situation. For example, the priority of each section of road in the target area may be determined according to the preset rule, and the cleaning order of each road is adjusted according to the target information to determine the cleaning route. Exemplarily, when the target information may show the presence of snow, fallen leaves and other situations affecting traffic on the road, the road may be cleaned first (e.g., improving the priority of the road).

Some embodiments of the disclosure also provide a related method for determining the cleaning route of the target area. As shown in FIG. 2, in some embodiments, step 230 may further include the following steps.

Step 231, determining an estimated amount of fallen leaves of each section of the road in the target area according to the target information.

The estimated amount of fallen leaves may refer to an amount of fallen leaves that may be generated by the sidewalk trees on both sides of each section of road. For example, the estimated amount of fallen leaves may include the total amount of fallen leaves generated by the sidewalk trees on both sides of each section of road after the last cleaning and before the next cleaning. As another example, the estimated amount of fallen leaves may include an amount of fallen leaves generated by the sidewalk trees on both sides of each section of road in each time period (e.g., every hour) from the last cleaning and to the next cleaning.

In some embodiments, the estimated amount of fallen leaves may be determined based on a preset formula according to the target information (e.g., the sidewalk tree information). For example, the preset formula may be: the estimated amount of fallen leaves=average amount of fallen leaves×preset time period, then the average amount of fallen leaves may be determined according to the related information (e.g., the type, denseness, etc. of the sidewalk trees) of the sidewalk trees on both sides of the road, and then the estimated amount of fallen leaves may be determined according to the average amount of fallen leaves and the preset time period. Exemplarily, a comparison table between the target information and the average amount of fallen leaves may be constructed according to historical situations of fallen leaves, the current average amount of fallen leaves is determined from the comparison table according to the current target information, and then the estimated amount of fallen leaves is determined according to the average amount of fallen leaves and the preset time period.

In some embodiments, the amount of fallen leaves of each section of road in the target area may be determined by processing the target information based on an estimation model for an amount of fallen leaves. The estimation model for the amount of fallen leaves may be a trained machine learning model. For more contents about the estimation model for the amount of fallen leaves, please refer to FIG. 5 and its related descriptions.

Step 232, determining an estimated falling range of fallen leaves of each section of the road in the target area according to the target information and the estimated amount of fallen leaves.

The estimated falling range of fallen leaves may refer to a coverage range of fallen leaves generated by each sidewalk tree on the road. For example, for each section of road, the estimated falling range of the section of road may be the part of the road surface of the section of road in the total falling range (i.e., a union set of fallen leaves of all the sidewalk trees) of the sidewalk trees on both sides of the road.

In some embodiments, the target information and the estimated amount of fallen leaves may be processed based on the preset rule to determine the estimated falling range. For example, a direct falling range (e.g., when the leaves fall directly, it may be normally distributed) of fallen leaves of each sidewalk tree without external force is determined based on the estimated amount of fallen leaves of each sidewalk tree, then an offset of the range of fallen leaves is determined based on the target information, and the estimated falling range is determined based on the direct falling range of fallen leaves of each sidewalk tree and the offset of the range of fallen leaves. Exemplarily, the corresponding relationship between the direct falling range of fallen leaves and the amount of fallen leaves, and the corresponding relationship between the target information and the offset of the range of fallen leaves may be fitted based on historical data.

In some embodiments, the target information and the estimated amount of fallen leaves may be processed based on a range estimation model to determine the estimated falling range of fallen leaves of each section of road in the target area, and the range estimation model may be a trained machine learning model. For more contents about the range estimation model, please refer to FIG. 5 and its related descriptions.

Step 233, determining a cleaning difficulty evaluation value of each section of road based on the estimated amount of fallen leaves and the estimated falling range of each section of road.

The cleaning difficulty evaluation value may reflect the cleaning difficulty of each road. For example, when the amount of fallen leaves accumulated on the road is higher, its cleaning difficulty is higher, and the corresponding cleaning difficulty evaluation value is higher.

In some embodiments, the cleaning difficulty evaluation value may be positively correlated with the estimated amount of fallen leaves and/or the estimated falling range. For example, when the estimated amount of fallen leaves is higher and/or the estimated falling range is larger, the cleaning difficulty evaluation value is greater.

In some embodiments, the cleaning difficulty evaluation value may be calculated through a preset formula. For example, the preset formula may be D=aZ+bS, where D is the cleaning difficulty evaluation value, Z is the estimated amount of fallen leaves, S is the area of the estimated falling range, and a and b are preset constants.

In some embodiments, the related parameters (e.g., the preset constants a and b) of the preset formula may be determined based on historical data. For example, the cleaning difficulty evaluation value may be set according to the cleaning time, the type of a cleaning vehicle and other factors when cleaning fallen leaves on each road in the historical data, and then the related parameters of the preset formula are determined by calculating (e.g., linear regression) based on the historical amount of fallen leaves and the historical falling range.

In some embodiments, the cleaning difficulty evaluation value may also be characterized by the related parameters during cleaning. For example, the cleaning difficulty evaluation value may also be characterized by the estimated cleaning time of the section of road, the full load rate of the cleaning vehicle, the number of cleaning round trips, or other related cleaning parameters of the section of the road when using conventional cleaning tools.

Step 234, determining a cleaning route based on the cleaning difficulty evaluation value of each section of road.

The cleaning route may refer to a running route of related vehicles (e.g., a garbage truck, a road sweeping vehicle, a washing and sweeping vehicle, etc.) used for cleaning when cleaning the road. Each cleaning route may include a plurality of sections of roads and a cleaning order of each section of road. For example, the cleaning route may include roads AB, BC, and CD, and the cleaning order is to perform cleaning in the order of AB, BC, and CD.

The cleaning route in the target area may refer to a route through which a cleaning task of the target area may be completed. For example, the cleaning route in the target area may include a plurality of routes, and the roads included in each route may cover each section of road that needs to be cleaned in the target area.

In some embodiments, each section of road that needs to be cleaned may be determined according to actual needs. For example, each section of road that needs to be cleaned may be each section of road in the target area. As another example, each section of road that needs to be cleaned may be a road in the target area whose cleaning difficulty evaluation value is greater than a preset threshold.

In some embodiments, the cleaning difficulty evaluation value of each section of road may be processed based on a preset algorithm to determine the cleaning route. For example, the cleaning difficulty evaluation value of each section of road may be processed based on a path planning algorithm (e.g., Dijkstra algorithm, A*algorithm, etc.) with the minimum cleaning difficulty evaluation value of each section of road in the cleaning route as the optimization objective to determine the cleaning route with the minimum total cleaning difficulty evaluation value.

In some embodiments, graph structure data may be constructed according to the cleaning difficulty evaluation value of each section of road, and then the graph structure data is processed based on the preset algorithm (e.g., an iterative algorithm based on the preset formula, an Almeida-PINEDA algorithm, etc.), and the cleaning route is determined according to the processed graph structure data. In some embodiments, for more content of processing the graph structure data by the iterative algorithm based on the preset formula, please refer to FIG. 6 and its related descriptions.

According to the method for managing the cleaning route in the smart city provided by some embodiments of this disclosure, the conditions of fallen leaves of the target area may be estimated and the cleaning route may be planned to improve the cleaning ability of the target area. In addition, the fallen leaves in this disclosure may also be replaced by snow and other objects to be cleaned through transfer learning so as to adapt to different cleaning needs.

FIG. 3 is an exemplary flowchart of the method for determining the cleaning route based on a plurality of target areas shown according to some embodiments of this disclosure. In the process 300, the cleaning route may be determined based on a plurality of target areas. In some embodiments, the process 300 may be implemented based on the Internet of Things system 100 for managing the cleaning route in the smart city.

As shown in FIG. 3, for each target area in the city, the process 300 includes the following steps.

Step 310, sending a target information obtaining instruction of the target area through sensor network sub-platforms corresponding to the target area. In some embodiments, step 310 may be implemented by the sensor network sub-platforms corresponding to the target area. For more contents about the sensor network sub-platforms, please refer to FIG. 1 and its related descriptions.

The target information obtaining instruction may be configured to control each sensor in the object platform to obtain the corresponding target information.

In some embodiments, the target information obtaining instruction may be generated in response to the periodic implementation of user operations and/or methods. For example, it may be implemented before each time of cleaning, and the sensor network sub-platforms may generate and send the target information obtaining instruction.

Step 320, obtaining the target information of the target area within the preset time period based on the object platform in response to the target information obtaining instruction, and sending the target information of the target area to the sensor network sub-platforms. In some embodiments, step 320 may be implemented by the object platform. The object platform may be part of the object platform connected to the sensor network sub-platforms corresponding to the target area.

For more contents about the target information of the target area within the preset time period, please refer to the related description of step 210, which will not be repeated here.

Step 330, sending the target information of the target area to management sub-platform corresponding to the target area through the sensor network sub-platforms. The management platform includes a plurality of management sub-platforms corresponding to various target areas in the city.

In some embodiments, step 330 may be implemented by the sensor network sub-platforms corresponding to the target area. For more contents of forwarding the target information of the target area within the preset time period by the sensor network sub-platforms, please refer to the related description of step 220, which will not be repeated here.

Step 340, determining a cleaning route of the target area by processing the target information of the target area based on the management sub-platforms.

In some embodiments, step 340 may be implemented by the management sub-platforms corresponding to the target area. For more contents about the management sub-platforms, please refer to FIG. 1 and its related descriptions. For more contents of determining the cleaning route of the target area by the management sub-platforms, please refer to the related description of step 230, which will not be repeated here.

In some embodiments, the Internet of Things system for managing the cleaning route in the smart city also includes a service platform and a user platform. The service platform may be configured to store related data, and the user platform may be configured to interact with a user. For more contents about the service platform and the user platform, please refer to FIG. 2 and related descriptions.

In some embodiments, after determining the cleaning route of each target area, the management sub-platforms may send relevant data to the service platform to present the cleaning route to the user through the service platform and user platform. In some embodiments, the service platform may summarize the cleaning routes of various target areas, and determine the cleaning route of the city and then present the cleaning route of the city to the user.

Therefore, as shown in FIG. 3, the process 300 may also include the following steps.

Step 350, sending the cleaning route of the target area to the service sub-platforms corresponding to the management sub-platforms through the management sub-platforms corresponding to the target area. In some embodiments, step 350 may be implemented by the management sub-platforms corresponding to the target area.

In some embodiments, after each management sub-platform determines the cleaning route of the corresponding target area, each management sub-platform may send the cleaning route to the corresponding service sub-platform. In some embodiments, when the management sub-platform sends a cleaning route, the relevant data in the calculation process may be sent together. For example, the management sub-platforms may package and send the target information, the estimated amount of fallen leaves, the estimated falling range, and the cleaning difficulty evaluation value of each section of road in the target area to the corresponding service sub-platforms to achieve backup of intermediate data.

Step 360, receiving the cleaning route of the target area through the service sub-platforms, and summarizing the cleaning route of the target area to the general database. In some embodiments, step 360 may be implemented by the service sub-platform corresponding to the target area. For more contents about the service sub-platforms, please refer to FIG. 1 and its related descriptions.

In some embodiments, each service sub-platform may be in communication connection with the general database. When the service sub-platforms receive the cleaning route of the target area sent by the corresponding management sub-platforms, the cleaning route of the target area may be forwarded to the general database to complete step 360.

Step 370, obtaining the cleaning route of the city by summarizing the cleaning route of each target area in the city based on the general database, and sending the cleaning route to the user platform. In some embodiments, step 370 may be implemented by the general database. For more contents about the general database, please refer to FIG. 1 and its related descriptions.

Summarizing of the cleaning route of the target area may refer to summary and statistics on the cleaning routes of various target areas.

In some embodiments, the general database may also make simple statistical processing on the cleaning route of each target area during summarizing. For example, whether there is repetition in the cleaning route of each target area may be judged and the repeated cleaning routes may be removed.

According to the method for managing the cleaning route in the smart city provided by some embodiments of this disclosure, the cleaning route of the city may be determined through the cleaning route of each target area. Therefore, the Internet of Things system for managing the cleaning route in the smart city provided by this disclosure may be arranged in a distributed manner to increase expansibility of the method for managing the cleaning route in the smart city.

It should be noted that the description of the above-mentioned processes 300 and 400 is intended only for examples and descriptions, and does not limit the scope of the application of this disclosure. For technicians skilled in the art, various corrections and modifications may be made on the processes 300 and 400 under the guidance of this disclosure. However, these corrections and modifications are still within the scope of this disclosure.

Figure 4:
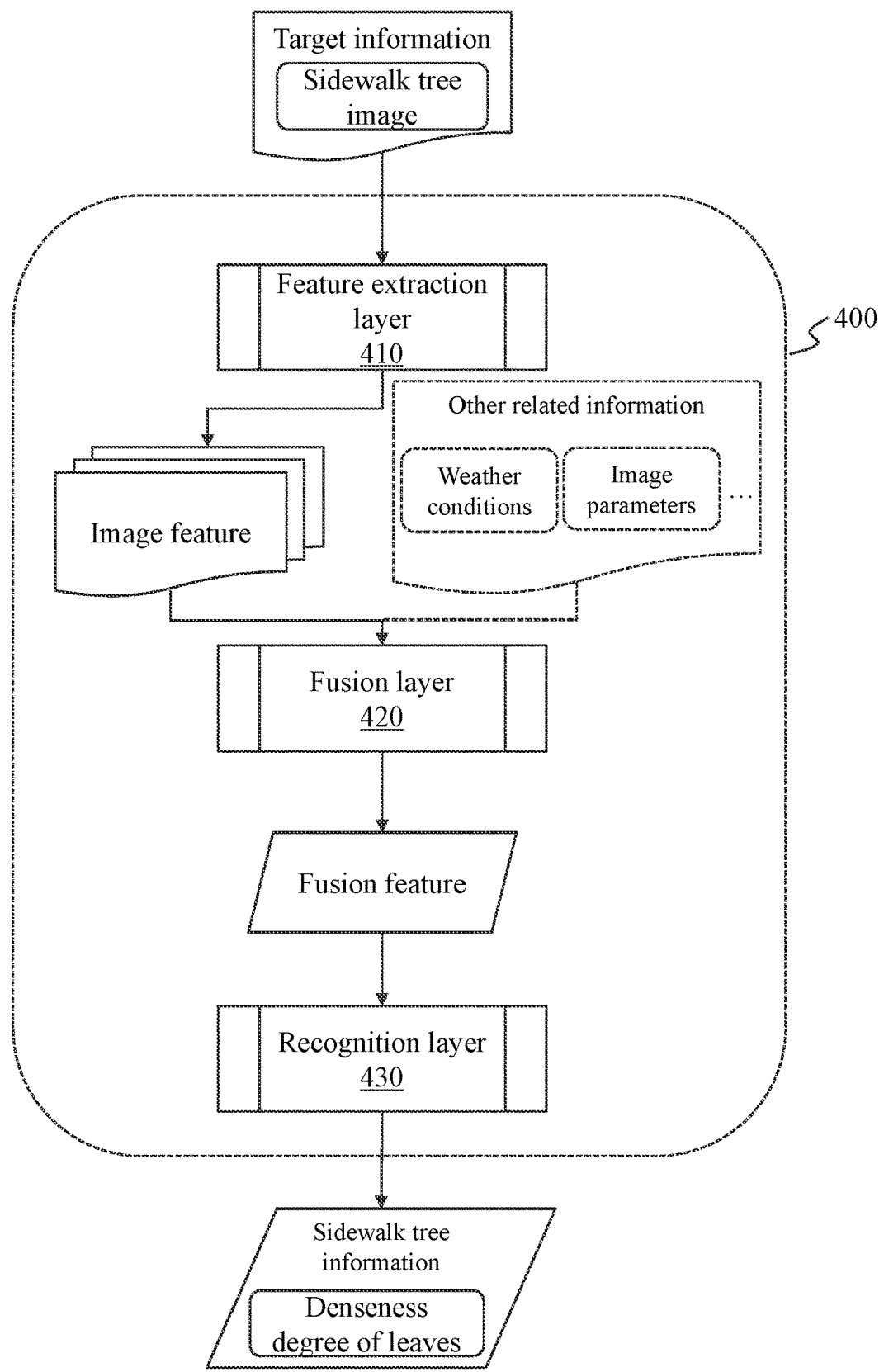
FIG. 4 is an exemplary schematic diagram of an image recognition model shown according to some embodiments of this disclosure.

FIG. 4 is an exemplary schematic diagram of an image recognition model according to some embodiments of this disclosure.

As shown in FIG. 4, the image recognition model 400 may process the target information to determine sidewalk tree information, and the target information may include a sidewalk tree image. Correspondingly, the image recognition model 400 may input the sidewalk tree image, and output the sidewalk tree information of the corresponding sidewalk tree after processing.

In some embodiments, the sidewalk tree information may include denseness degree of leaves. The denseness degree of leaves may be used to reflect the growth of leaves of sidewalk trees, and then reflect the falling possibility of leaves. In some embodiments, the denseness degree of leaves may be characterized by a denseness degree score of leaves, and the higher the denseness degree score of leaves means that the leaves are denser.

In some embodiments, the denseness degree score of leaves may be determined based on an average denseness degree. For example, average leaf characteristics (e.g., an average crown size, an average leaf color, an average leaf density, or other indicators) of various sidewalk trees in each period may be determined according to historical data, and then the denseness degree score of leaves is determined by comparing the leaf characteristics of the current sidewalk tree with the average leaf characteristics. For example, if the crown size of the current sidewalk tree is greater than the average crown size, the current denseness degree score of leaves may be greater than a preset average score (e.g., 5 points). In some embodiments, the denseness degree score of leaves may also be artificially set by staff.

In some embodiments, the image recognition model 400 may include a feature extraction layer 410, a fusion layer 420, and a recognition layer 430. The sidewalk image is processed by the feature extraction layer 410, the fusion layer 420, and the recognition layer 430 to determine the denseness degree of leaves.

In some embodiments, the sidewalk tree image may be inputted into the feature extraction layer, and a plurality of image features may be determined by convolution processing of the feature extraction layer 410. Then a plurality of image features may be inputted into the fusion layer 420, and fusion features may be determined by fusion processing of the fusion layer 420. Finally, the fusion features are inputted into the recognition layer 430, and the denseness degree of leaves is determined by processing of the recognition layer 430.

The feature extraction layer 410 may be a trained convolutional neural network, and may be used to extract the features in the sidewalk tree image. The feature extraction layer 410 may include a plurality of convolution kernels. When the sidewalk tree image is inputted into the feature extraction layer 410, a plurality of image features with different sizes may be outputted by processing of each convolution kernel.

In some embodiments, the feature extraction layer 410 may be implemented through a feature pyramid networks (FPN). For example, the feature extraction layer 410 may include a plurality of convolution kernels with different sizes. When the sidewalk tree image is inputted into the feature extraction layer 410, a plurality of intermediate image features may be outputted by processing of convolution kernels with difference sizes in turn. The size of the intermediate image features may gradually decrease with the processing of the convolution kernel. Then the intermediate image features with the smallest size are fused with other intermediate image features (such as extending the small-sized intermediate image features and then adding the pixels at the corresponding positions) to determine a plurality of image features with different sizes.

The fusion layer 420 may be used to fuse the image features with different sizes to obtain fusion features. In some embodiments, the fusion layer 420 may include a size normalization module and a superposition module. The size normalization module may use scale expansion, interpolation, pooling, or other methods to make the image features with different sizes normalize the same size. The superposition module may superpose (such as weighted summing) a plurality of image features with the same size to obtain the fusion features.

In some embodiments, in order to improve the representation capability of the fusion features, other related data may also be inputted into the fusion layer 420, so that the fusion features are enabled to contain corresponding information. For example, the fusion layer 420 may also input other related data such as weather conditions (e.g., cloudy or sunny, fog or haze, etc.), image parameters (e.g., image size, resolution), and the distance between a camera and the trees when the image is captured.

In some embodiments, when the fusion layer 420 integrates other related data into the image features, a feature vector may be constructed in addition to the fusion features based on the image features, and other related data fill in the feature vector. In some embodiments, the fusion layer 420 may also process other related data to determine adjustment parameters (e.g., contrast), and adjust the corresponding image features based on adjustment parameters, so that the fusion features include other related data. For example, when the weather is cloudy, the contrast of the picture may be increased when the fusion layer 420 determines the fusion features.

The recognition layer 430 may be used to process the fusion features to determine the denseness degree of leaves. In some embodiments, the recognition layer 430 may be implemented through a classifier, and the classifier processing may fuse the features to obtain the denseness degree score of leaves.

In some embodiments, the training data of the image recognition model 400 may be constructed based on historical data, and an initial image recognition model may be trained based on the training data until a training target is completed. The training target may include the number of iterations exceeding a threshold and error convergence. The initial image recognition model may be an image recognition model 400 without setting parameters.

In some embodiments, the training data may include a plurality of training samples and corresponding training tags. The training samples may be historical target information (e.g., historical sidewalk tree images) in the historical data, and the training tags may be sidewalk tree information (e.g., historical denseness degree of leaves) determined (manual labeling) based on the historical target information. When the training samples are inputted into the initial image recognition model, the training samples are processed by the initial image recognition model to determine the output of the initial image recognition model, and each parameter in the initial image recognition model may be iterated based on a loss function according to the output of the initial image recognition model and the corresponding sample tags.

In some embodiments, the initial image recognition model may include an initial feature extraction layer, an initial fusion layer, and an initial recognition layer. The initial feature extraction layer may be the feature extraction layer 410 without setting the parameters. The initial fusion layer may be the fusion layer 420 without setting the parameters. The initial recognition layer may be the recognition layer 430 without setting the parameters. Correspondingly, when the training samples are inputted into the initial image recognition model, the training samples are processed by the initial feature extraction layer, the initial fusion layer, and the initial recognition layer in turn to determine the output of the initial image recognition model. The parameters of the initial feature extraction layer, the initial fusion layer, and the initial recognition layer may be updated with parameter iteration of the initial image recognition model, and when the training of the initial image recognition model is completed, the trained initial feature extraction layer, the initial fusion layer, and the initial recognition layer may be used as the corresponding feature extraction layer 410, the fusion layer 420 and the recognition layer 430.

According to the image recognition model provided by some embodiments of this disclosure, the features in the target information may be fully analyzed through the feature images of various sizes to improve the accuracy of the sidewalk tree information. In addition, other relevant information may be introduced into the calculation of the sidewalk tree information to further improve the accuracy of the sidewalk tree information.

Figure 5:
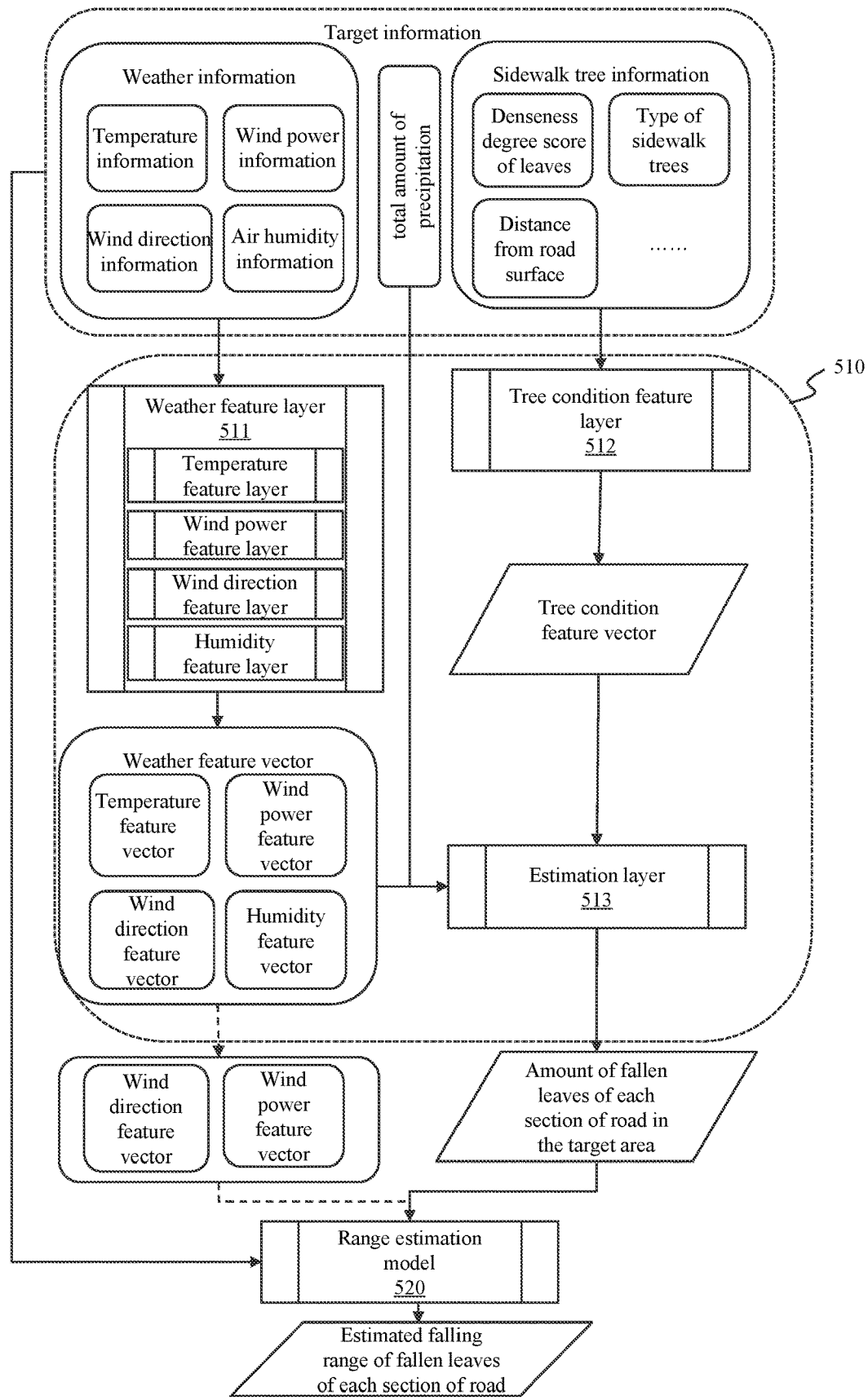
FIG. 5 is an exemplary schematic diagram of an estimation model for an amount of fallen leaves and a range estimation model shown according to some embodiments of this disclosure.

FIG. 5 is an exemplary schematic diagram of an estimation model for an amount of fallen leaves and a range estimation model according to some embodiments of present disclosure.

As shown in FIG. 5, the estimation model for the amount of fallen leaves 510 may process the target information to determine the amount of fallen leaves of each section of road in the target area. The range estimation model 520 may process the target information and the estimated amount of fallen leaves to determine the estimated falling range of fallen leaves of each section of road in the target area. An output (fallen leaves of each section of road of the target area) of the estimation model 510 for the amount of fallen leaves may be used as an input of the range estimation model 520. The output (the denseness degree score of leaves) of the aforementioned image recognition model 400 may be used as a parameter of the target information to be inputted into the estimation model for the amount of fallen leaves 510 and the range estimation model 520.

In some embodiments, the estimation model for the amount of fallen leaves 510 includes a weather feature layer 511, a tree condition feature layer 512 and an estimation layer 513. The weather feature layer 511 is configured to process weather information within a preset time period in the target information to obtain a weather feature vector. The tree condition feature layer 512 is configured to process the sidewalk tree information in the target information to obtain a tree condition feature vector. The estimation layer 513 is configured to predict the amount of fallen leaves of each section of road in the target area based on the weather feature vector and the tree condition feature vector.

The input of the weather feature layer 511 may be the weather information within the preset time period in the target information, and the output of the weather feature layer 511 may be the weather feature vector. In some embodiments, the weather feature layer 511 may be implemented through a deep neural network (DNN). The weather information may be input into an input layer of the weather feature layer and the weather feature vector may be output through an output layer after processing of a hidden layer.

In some embodiments, the weather information may include different types of weather information, and the corresponding weather feature layer 511 may be implemented through different weather feature layers. The weather feature vector may include different types of feature vectors.

In some embodiments, the weather feature vector may include a plurality of elements, where each element of the weather feature vector may correspond to different time points within the preset time period. The corresponding element value may reflect the weather conditions of each time point.

In some embodiments, the weather information may include temperature information, wind power information, wind direction information, or air humidity information. The corresponding weather feature layer may include a temperature feature layer, a wind power feature layer, a humidity feature layer, and a wind direction feature layer. The temperature feature layer is used to obtain a temperature feature vector based on the temperature information. The wind power feature layer is used to obtain a wind power feature vector based on the wind power information. The humidity feature layer is used to obtain a humidity feature vector based on the air humidity information. The wind direction feature layer is used to obtain a wind direction feature vector based on the wind direction information.

In some embodiments, each element value of the weather feature vector may be presented in the form of a vector, then the corresponding various weather features (e.g., the temperature feature vector, the wind power feature vector, the humidity feature vector, the wind direction feature vector, etc.) may be a vector composed of a certain element in each element value of the weather feature vector. Correspondingly, after obtaining the temperature feature vector, the wind power feature vector, the humidity feature vector, and the wind direction feature vectors, each element value of the weather feature vector may be determined according to the time point so as to determine the weather feature vector.

The input of the tree condition feature layer 512 may be the sidewalk tree information in the target information, and the output of the tree condition feature layer 512 may be the tree condition feature vector. In some embodiments, the tree condition feature layer 512 may be implemented through a deep neural network (DNN), the sidewalk tree information may be inputted into the input layer of the tree condition feature layer, and the tree condition feature vector is outputted through the output layer after processing of the hidden layer.

In some embodiments, the sidewalk tree information may include related information such as the denseness degree score of leaves, the type of sidewalk trees, the age of trees, the distance from the road surface, and the planting spacing of adjacent trees. Information such as the type of sidewalk trees, the age of trees, the distance from the road surface, and planting spacing of adjacent trees may be determined through a preset database (e.g., a database of urban greening related agencies). The denseness degree score of leaves may be determined through the aforementioned image recognition model 400.

The tree condition feature vector may reflect the tree conditions of various sidewalk trees. The tree condition feature vector may include a plurality of elements, and each element may reflect part of the tree conditions of the sidewalk tree. For example, the tree condition feature vector may include an element reflecting a rate fallen leaves. The element value of the element may describe a specific value of the rate of fallen leaves of the sidewalk tree.

The input of the estimation layer 513 may be the weather feature vector and the tree condition feature vector of each sidewalk tree in each section of road, and the output of the estimation layer 513 may be the amount of fallen leaves of each section of road in the target area. In some embodiments, when precipitation weather exists, the total amount of precipitation may also be used as the input of the estimation layer 513.

In some embodiments, the estimation layer 513 may be implemented through a deep neural network (DNN). The weather feature vector, the tree condition feature vector, and the total amount of precipitation may be inputted into the input layer of the tree condition feature layer, and the amount of fallen leaves of the sidewalk tree may be outputted through the output layer after processing of the hidden layer.

In some embodiments, the tree condition feature vector may be inputted into the estimation layer 513 one by one, so that the estimation layer 513 estimates the amount of fallen leaves of the sidewalk tree, and determines the amount of fallen leaves of each section of road based on the amount of fallen leaves of each sidewalk tree in each section of road. In some embodiments, each tree condition feature vector of each road may also be directly inputted into the estimation layer 513 to directly determine the amount of fallen leaves of the road.

The total amount of precipitation may reflect the precipitation of the target area within the preset time. The total amount of precipitation may include the current water accumulation and current precipitation speed of each section of road of the target area.

The input of the range estimation model 520 may be the target information and the estimated amount of fallen leaves to determine the estimated falling range of fallen leaves of each section of road in the target area. In some embodiments, considering that some of the information of the target information has been processed through the estimation model for the amount of fallen leaves 510, in order to reduce the calculation amount, the output of the estimation model for the amount of fallen leaves 510 and the intermediate result may be used as the input of the range estimation model 520. For example, the estimated amount of fallen leaves, the wind power feature vector, and the wind speed feature vector may be used as the input of the range estimation model 520.

In some embodiments, the range estimation model 520 may be implemented through the deep neural network (DNN). The estimated amount of fallen leaves, the wind power feature vector, and the wind speed feature vector may be inputted into the input layer of the range estimation model 520, and the estimated falling range of the sidewalk tree may be outputted through the output layer after processing of the hidden layer.

In some embodiments, the estimation model for the amount of fallen leaves 510 and the range estimation model 520 may be subject to joint training, i.e., a training model may be constructed based on the estimation model for the amount of fallen leaves and the range estimation model. The training model may include an initial estimation model for an amount of fallen leaves and an initial range estimation model, which are connected with each other. The initial estimation model for the amount of fallen leaves and the initial range estimation model may be the estimation model for the amount of fallen leaves 510 without setting parameters and the range estimation model 520 without setting parameters. In the training model, the output (e.g., the estimated among of fallen leaves) of the initial estimation model for the amount of fallen leaves and part of the intermediate result (e.g., the wind power feature vector and the wind speed feature vector) may be inputted into the initial range estimation model.

In some embodiments, training samples and corresponding sample tags may be constructed based on the historical data. The training samples may be the target information (e.g., historical sidewalk tree information, historical weather information, and total historical precipitation, etc.) within historical time periods, and the sample tags may be the corresponding historical falling range. The historical falling range may be measured, calculated and marked by the cleaning staff during the historical cleaning process.

The training samples may be inputted into the training model during training. The training samples may be trained and processed by the initial estimation model for the amount of fallen leaves. The output of the initial estimation model for the amount of fallen leaves and part of the intermediate result (e.g., the estimated amount of fallen leaves, the wind power feature vector, the wind speed feature vector) are inputted into the initial range estimation model, the output of the initial range model is determined by the initial range estimation model. Then a loss function is constructed based on the output of the initial range estimation model and sample tags to iterate the parameters of the training model until the training is completed. The training completion may include the number of iterations exceeding the threshold, error convergence, etc. With the parameter iteration of the training model, the parameters of the initial estimation model for the amount of fallen leaves and the initial range estimation model are also updated, and the trained initial estimation model for the amount of fallen leaves and the trained initial range estimation model may be used as the estimation model for the amount of fallen leaves 510 and the range estimation model 520.

In some embodiments, the sample tags may further include a historical amount of fallen leaves. The historical amount of fallen leaves may be calculated and marked by the fallen leaves collected by the cleaning staff during the historical cleaning process. During joint training, after constructing the loss function based on the output of the initial range estimation model and the sample tags to iterate the parameters, the loss function of the initial estimation model for the amount of fallen leaves may be constructed based on the output of the initial estimation model for the amount of fallen leaves and the historical amount of fallen leaves to further train the initial estimation model for the amount of fallen leaves.

In some embodiments, the initial range estimation model may include an initial weather feature layer, an initial tree condition feature layer, and an initial estimation layer. The parameters of the initial weather feature layer, the initial tree condition feature layer, and the initial estimation layer may be updated with the iteration of the initial estimation model for the amount of fallen leaves and/or the training model. When the training of the initial estimation model for the amount of fallen leaves is completed, the trained initial weather feature layer, the initial tree condition feature layer, and the initial estimation layer may be respectively used as the weather feature layer 511, the tree condition feature layer 512 and the estimation layer 513.

According to the estimation model for the amount of fallen leaves and the range estimation model provided by some embodiments of this disclosure, the target information may be fully used so as to improve the accuracy of the amount of fallen leaves and the falling range. In addition, the output of the estimation model for the amount of fallen leaves and part of intermediate results are inputted into the range estimation model, which eliminates the re-processing of the target information by the range estimation model, so as to reduce the redundant calculation amount and improve the calculation efficiency. During training, the estimation model for the amount of fallen leaves and the range estimation model are subject to joint training, which improves the integrity of the estimation model for the amount of fallen leaves and the range estimation model, and then improves the accuracy of the amount of fallen leaves and the falling range.

Figure 6:
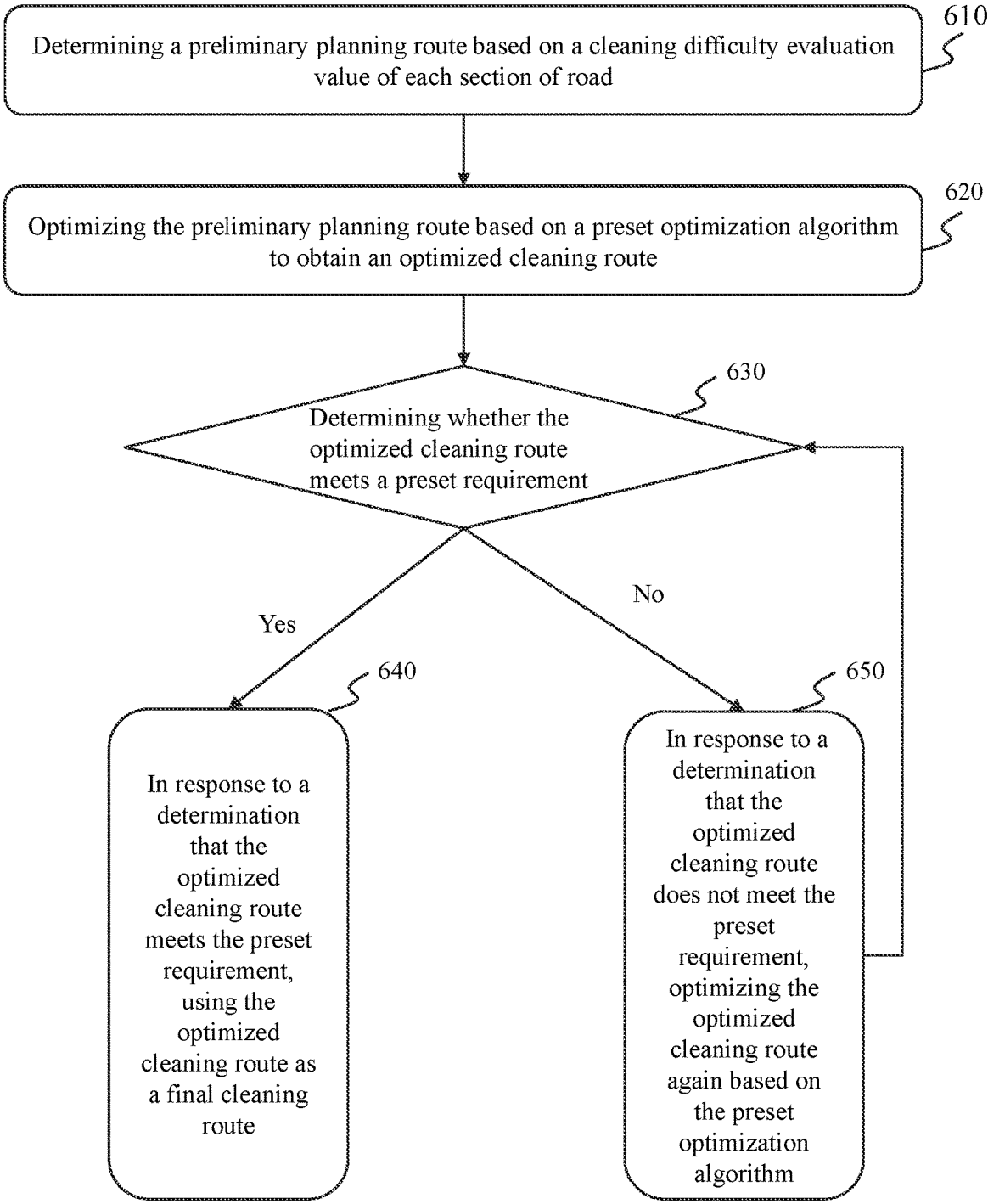
FIG. 6 is an exemplary flowchart of determining a cleaning route shown according to some embodiments of this disclosure.

FIG. 6 is an exemplary flowchart of determining a cleaning route according to some embodiments of this disclosure. In some embodiments, a process 600 may be implemented by the management platform or the corresponding management sub-platforms.

As shown in FIG. 6, the process 600 may include the following steps.

Step 610, determining a preliminary planning route based on a cleaning difficulty evaluation value of each section of road.

The preliminary planning route may refer to preliminarily determined the cleaning route of the target area. For example, the preliminary planning route may include all the cleaning routes that may exist in the target area, i.e., continuous road sections may be determined according to the connection relationship between each section of road and used as the preliminary planning route. The continuous road sections may refer to two road sections of sharing an intersection. For example, a road section AB and a road section AC sharing an intersection, one may drive from the road section AB to the road section AC through the intersection A, and at this time, the road section AB and the road section AC are continuous.

In some embodiments, the preliminary planning route and the subsequent cleaning route of the target area may be determined based on an area planning diagram. The area planning diagram is graph structure data constructed based on the cleaning difficulty evaluation value of each section of road and the actual traffic conditions of the road.

The graph structure data may be a kind of directed structure data. The graph structure data includes a plurality of nodes and edges between the nodes. In some embodiments, the actual meaning of nodes and edges of the graph structure data may be determined according to an application scenario. For the area planning diagram in this disclosure, the nodes in the area planning diagram may characterize each section of road, and the edges may reflect whether the corresponding two road sections are classified into the same route, i.e., when the edge exists between the two nodes, it reflects that there is a continuous route through the two nodes in the cleaning route.

In some embodiments, the area planning diagram may be constructed based on each continuous road section in the target area, and then the node attributes and the edge data may be determined based on the cleaning difficulty evaluation value of each section of road.

In some embodiments, in order to determine whether to classify the continuous road sections into one route, a uniform cleaning score may be used as an edge attribute between the continuous roads. When the unified cleaning value meets the preset conditions (e.g., exceeding the threshold), the corresponding continuous road sections are classified into the same route.

In some embodiments, when determining the area planning diagram of the target area, the unified cleaning value of each section of road may be determined first according to the traffic conditions between each section of road and the cleaning difficulty evaluation value of each section of road; and then the area planning diagram is constructed based on the basic road information, the cleaning difficulty evaluation value of each section, and the unified cleaning score between each section of road to determine the preliminary planning route.

In some embodiments, each node of the area planning diagram may be determined according to the basic road information and the cleaning difficulty evaluation value of each section of road; the edges between the corresponding nodes in the area planning diagram may be constructed according to the connection relationship between each section of road; the unified cleaning value between each section of road may be used as an edge score of the corresponding edge; and the preliminary planning route may be determined according to the edges in the area planning diagram and the scores of the corresponding edges.

In some embodiments, when constructing the area planning diagram, the unified cleaning value between each section of road may be initialized according to whether each section of road is continuous. For example, an initial unified cleaning score may be set for the continuous road sections of the target area. The initial unified cleaning score may be a preset value (e.g., 100), in the subsequent steps, the unified cleaning score may be iterated based on the cleaning difficulty evaluation value and the related data. When the unified cleaning score meets the preset condition (e.g., less than the threshold) after iteration, the edges between the corresponding nodes may be canceled, i.e., the corresponding two road sections may not be planned as a route.

In some embodiments, in order to facilitate the iteration of the unified cleaning score, the node properties of each node of the area planning diagram may include related parameters for iterating the unified cleaning score. For example, the node attributes may include the cleaning difficulty score (which may be recorded as D) of the corresponding road section, and the length (which may be recorded as L) of the road section. Similarly, the edge attributes of each edge of the area planning diagram may include the unified cleaning score for iteration and related parameters thereof. For example, the edge attributes may include the traffic cost (which may be recorded as C) between the two connected road sections, and the current unified cleaning route score (which may be recorded as F).

The traffic cost may refer to the cost of traveling between the two continuous roads. In some embodiments, the traffic cost may be determined based on driving time of a cleaning vehicle, duration of traffic lights, and the frequency of turning around. For example, when the duration of traffic lights between the two road sections is long, the time cost of the cleaning vehicle passing through the intersection is high, and the corresponding traffic cost increases.

Step 620, optimizing the preliminary planning route based on a preset optimization algorithm to obtain an optimized cleaning route.

In some embodiments, the preset optimization algorithm may be an update algorithm of the unified cleaning route score, i.e., when optimizing the planned route based on the preset optimization algorithm, it may be implemented by iterating the unified cleaning route score. Further, the edge score (i.e., the unified cleaning route score) in each piece of edge information may be updated first according to a preset rule; then the edge whose updated edge score is less than a preset threshold in the area planning diagram is removed; and finally, the optimized cleaning route is determined according to the updated edges in the area planning diagram and the scores of the corresponding edges.

In some embodiments, the preset optimization algorithm is an algorithm capable of iterating the unified cleaning route score. For example, for a node 1, a node 2 and an edge 12 between the node 1 and the node 2, the unified cleaning route score after iteration of the edge 12 may be $F'=F-aC_{12}-r[c(D_1+D_2)-D_{average}]/(L_1+L_2)$, where F' is the unified cleaning route score after iteration of the edge 12, F is the unified cleaning route score before iteration of the edge 12, $C_{12}$ may refer to the traffic cost of the edge 12, $D_1$ may be the cleaning difficulty score of the node 1, $D_2$ may be the cleaning difficulty score of the node 2, $D_{average}$ may be the average cleaning difficulty score of each node in the target area, $L_1$ may be the length of the road section of the node 1, and $L_2$ may be the length of the road section of the node 2.

In some embodiments, the edge may be deleted when the updated unified cleaning route score is less than a preset threshold, so that the two nodes connected by the edge are not classified as the route. The edge of the area planning diagram is also updated based on the updating of the edge score. Therefore, the optimized cleaning route may be determined based on the updated area planning diagram. The optimized cleaning route may be a sequence of all the continuous nodes in the updated area planning diagram.

In some embodiments, the preset optimization algorithm may also be an update algorithm of the graph structure data. For example, the preset optimization calculation may be a trained Graph Neural Network (GNN) based on a knowledge graph. The area planning diagram may be inputted into the a GNN model during updating, and the updated area planning diagram is outputted after processing of the GNN model. For example, the GNN model may use an operations research algorithm based on the node attributes and the edge attributes to calculate the cleaning cost of each route, and determine a route set with the lowest cost through iteration, and cancel the edges outside the route set to use as the updated area planning diagram.

Step 630, determining whether the optimized cleaning route meets a preset requirement.

The preset requirement may be a preset restrictions on the cleaning route. For example, the preset requirement may include the number requirement of the cleaning route, the length requirement of the cleaning route, etc. In some embodiments, the preset requirement may be determined according to the actual situation. For example, the number requirement of the cleaning route may be determined according to the number of cleansing vehicles in the target area. Exemplarily, the number requirement of the cleaning route may include that the total number of the cleaning route is not be greater than the number of the cleaning vehicles in the target area.

In some embodiments, for the area planning diagram, the preset requirement may be characterized as the restrictions on the route in the area planning diagram and/or the restrictions on the edge. For example, the preset requirement may include that the number of routes is less than a first preset threshold and/or the number of edges is less than a second preset threshold, i.e., when determining whether the optimized cleaning route meets the preset requirement, the number of routes in the optimized cleaning route may be determined first, and then it is determined whether the number of the routes is less than the first preset threshold. If the number of the routes is less than the first preset threshold, the optimized cleaning route meets the preset requirement. It is further determined whether the number of the edges is less than the second preset threshold. If the number of the edges is less than the second preset threshold, the optimized cleaning route meets the preset requirement.

The routes in the area planning diagram may refer to a node sequence capable of connecting all the nodes along the edge from a certain node in the area planning diagram. For example, nodes A, B, C, and D are sequentially connected by an edge, and the nodes A, B, C, and D form a route. In some embodiments, when the node is connected with more than three nodes at the same time, the number of routes may be repeatedly calculated. For example, the node A is also connected to nodes E and F, and the nodes A, E, and F may also form a route.

The first preset threshold and the second preset threshold may be values determined according to the actual situation. For example, the first preset threshold may be determined according to the number of cleaning vehicles in the target area. Exemplarily, the first preset threshold may be less than the number of cleaning vehicles in the target area. As another example, the second preset threshold may be determined according to the number of roads in the target area. Exemplarily, the second preset threshold may be 2n−1, and n is the number of roads in the target area.

Step 640, in response to a determination that the optimized cleaning route meets the preset requirement, using the optimized cleaning route as a final cleaning route.

According to the judgment result of the aforementioned step 630, when the optimized cleaning route meets the preset requirements, the optimized cleaning route may be used as the cleaning route of the target area.

Step 650, in response to a determination that the optimized cleaning route does not meet the preset requirement, optimizing the optimized cleaning route again based on the preset optimization algorithm.

According to the determination result of the aforementioned step 630, when the optimized cleaning route meets the preset requirements, the step 620 may be re-executed based on the optimized cleaning route so as to optimize the cleaning route again until the optimized route meets the preset requirements.

According to the method for determining the cleaning route provided by some embodiments of this disclosure, the area planning diagram may be constructed, the road sections are used as the nodes, it is characterized whether the road sections are on the same route by the edges for presenting intuitively the cleaning route, and the area planning diagram is quantitatively iterated by the unified cleaning route score, thereby improving the rationality of the cleaning route, and reducing the cleaning cost of the cleaning route. In addition, it may be determined whether the area planning diagram meets the preset requirements, the requirements in the cleaning process are quantified, and the rationality of the cleaning route is further improved.

The basic concept has been described above. Obviously, for the technicians skilled in the arts, the above detailed disclosure is only used as an example, and does not constitute a limitation of the present disclosure. Although not explicitly described herein, various modifications, improvements, and corrections to this disclosure may occur to the technicians skilled in the art. Such modifications, improvements, and corrections are suggested in this disclosure and thereof remain within the spirit and scope of the exemplary embodiments of this disclosure.

Meanwhile, the present disclosure uses specific words to describe the embodiments of the present disclosure. For example, "one embodiment", "an embodiment", and/or "some embodiments" refer to a certain feature, structure, or characteristic associated with at least one embodiment of this disclosure. Therefore, it should be emphasized and noticed that two or more references in this disclosure to "an embodiment" or "one embodiment" or "an alternative embodiment" that are mentioned in different positions in this disclosure do not necessarily mean the same embodiment. In addition, some features, structures, or characteristics of one or more embodiments in this disclosure may be properly combined.

Furthermore, unless explicitly stated in the claims, the order of processing elements and sequences described in this disclosure, the use of alphanumerics, or the use of other names is not intended to limit the order of the processes and methods of this disclosure. While the foregoing disclosure discusses by way of various examples some embodiments of the disclosure presently believed to be useful, it is to be understood that such details are for purposes of illustration only and that the appended claims are not limited to the disclosed embodiments, but rather are intended to cover all modifications and equivalent combinations that fall within the essence and scope of the embodiments of this disclosure. For example, although the implementation of various components described above may be embodied in a hardware device, it may also be implemented as a software only solution, e.g., an installation on an existing server or mobile device.

Similarly, it should be noted that, in order to simplify the expressions disclosed in this disclosure and thus help the understanding of one or more embodiments of the disclosure, in the foregoing description of the embodiments of this disclosure, various features may sometimes be combined into one embodiment, in the drawings or descriptions thereof. However, this method of disclosure does not imply that the subject matter of the disclosure requires more features than are recited in the claims. Rather, the claimed subject matter may lie in less than all features of a single foregoing disclosed embodiment.

Some embodiments use numbers to describe quantities of ingredients and attributes, it should be understood that such numbers used to describe the embodiments, in some examples, use the modifiers "about", "approximately" or "substantially" to retouch. Unless stated otherwise, "about", "approximately" or "substantially" means that a variation of ±20% is allowed for the stated number. Accordingly, in some embodiments, the numerical parameters set forth in the disclosure and claims are approximations that may vary depending upon the desired characteristics of individual embodiments. In some embodiments, the numerical parameters should take into account the specified significant digits and use a general digit. Notwithstanding that the numerical fields and parameters used in some embodiments of this disclosure to confirm the breadth of their ranges are approximations, in specific embodiments such numerical values are set as precisely as practicable.

For each patent, patent application, patent application publication, and other material, such as an article, a book, a specification, a publication, a document, etc., cited in this disclosure, the entire contents are hereby incorporated into this disclosure for reference. Application history documents that are inconsistent with or conflict with the contents of this disclosure are excluded, as are documents (currently or hereafter appended to this disclosure) limiting the broadest scope of the claims of this disclosure. It should be noted that, if there is any inconsistency or conflict between the descriptions, definitions and/or use of terms in the accompanying materials of this disclosure and the contents of this disclosure, the descriptions, definitions and/or use of terms in this disclosure shall prevail.

Finally, it should be understood that the embodiments described in this disclosure are only intended to illustrate the principles of the embodiments of this disclosure. Other variants may also belong to the scope of this disclosure. Accordingly, by way of example and not limitation, alternative configurations of the embodiments of this disclosure may be considered consistent with the instruction of this disclosure. Accordingly, the embodiments of this disclosure are not limited to those expressly introduced and described in this disclosure.

What is claimed is:

1. A method for managing a cleaning route in a smart city, implemented based on an Internet of Things system for managing the cleaning route in the smart city, wherein the Internet of Things system for managing the cleaning route in the smart city includes a management platform, a sensor network platform, and an object platform; the method including:
   obtaining target information of a target area within a preset time period based on the object platform, wherein the target information includes at least one of road monitoring information, weather information, and sidewalk tree information;
   sending the target information of the target area to the management platform through the sensor network platform;
   determining a cleaning route of the target area by processing the target information of the target area based on the management platform, including:
      determining an estimated amount of fallen leaves of each section of road in the target area according to the target information;
      determining an estimated falling range of fallen leaves of each section of road in the target area according to the target information and the estimated amount of fallen leaves;
      determining a cleaning difficulty evaluation value of each section of road based on the estimated amount of fallen leaves and the estimated falling range of each section of road; and
      determining the cleaning route based on the cleaning difficulty evaluation value of each section of road.

2. The method of claim 1, wherein the sensor network platform includes a plurality of sensor network sub-platforms corresponding to various target areas in a city, and the management platform includes a plurality of management sub-platforms corresponding to various target areas in the city;
   for each target area in the city, the method including:
      sending a target information obtaining instruction of a target area through a sensor network platform corresponding to the target area;
      obtaining the target information of the target area within the preset time period based on the object platform in response to the target information obtaining instruction, and sending the target information of the target area to the sensor network sub-platform;
      sending the target information of the target area to a management sub-platform corresponding to the target area through the sensor network platform; and
      determining the cleaning route of the target area by processing the target information of the target area based on the management sub-platform.

3. The method of claim 2, wherein the Internet of Things system for managing the cleaning route in the smart city also includes a service platform and a user platform, the service platform includes a plurality of service sub-platforms corresponding to all the management sub-platforms and a general database for summarizing and processing data of the plurality of service sub-platforms;
   for each target area in the city, the method also including:
      sending the cleaning route of the target area to the service sub-platform corresponding to the management sub-platform through the management sub-platform corresponding to the target area;
      receiving the cleaning route of the target area through the service sub-platform, and summarizing the cleaning route of the target area to the general database; and
      obtaining the cleaning route of the city by summarizing the cleaning route of each target area in the city based on the general database, and sending the cleaning route of the city to the user platform.

4. The method of claim 1, wherein the obtaining target information of a target area within a preset time period based on the object platform includes:
   determining a sidewalk tree image based on the road monitoring information; and
   determining the sidewalk tree information by processing the image of the sidewalk trees based on an image recognition model, wherein the image recognition model is a machine learning model.

5. The method of claim 1, wherein the determining an estimated amount of fallen leaves of each section of road in the target area according to the target information includes:
   determining an amount of fallen leaves of each section of road in the target area by processing the target information based on an estimation model for the amount of fallen leaves, wherein the estimation model for the amount of fallen leaves is a machine learning model.

6. The method of claim 1, wherein the determining an estimated falling range of fallen leaves of each section of the road in the target area according to the target information and the estimated amount of fallen leaves includes:
   determining an estimated falling range of fallen leaves of each section of road in the target area by processing the target information and the estimated amount of fallen leaves based on a range estimation model, wherein the range estimation model is a machine learning model.

7. The method of claim 1, wherein the determining a cleaning route based on a cleaning difficulty evaluation value of each section of road includes:

determining a preliminary planning route based on the cleaning difficulty evaluation value of each section of road;

obtaining an optimized cleaning route by optimizing the preliminary planning route based on a preset optimization algorithm;

determining whether the optimized cleaning route meets a preset requirement;

in response to a determination that the optimized cleaning route meets the preset requirement, using the optimized cleaning route as a final cleaning route; and in response to a determination that the optimized cleaning route does not meet the preset requirement, optimizing the optimized cleaning route again based on the preset optimization algorithm.

8. The method of claim 7, wherein the determining a preliminary planning route based on the cleaning difficulty evaluation value of each section of road includes:

obtaining basic road information of each section of road and traffic conditions between sections of road;

determining a unified cleaning score between the sections of road according to the traffic conditions between the sections of road and the cleaning difficulty evaluation value of each section of the road; and determining the preliminary planning route by constructing an area planning diagram according to the basic road information and the cleaning difficulty evaluation value of each section of road and the unified cleaning score between the sections of the road, including:

determining each node of the area planning diagram according to the basic road information and the cleaning difficulty evaluation value of each section of road;

constructing edges between the corresponding nodes in the area planning diagram according to a connection relationship between the sections of road;

using the unified cleaning score between the sections of road as an edge score of a corresponding edge; and determining the preliminary planning route according to the edges in the area planning diagram and the corresponding edge scores.

9. The method of claim 8, wherein the determining whether the optimized cleaning route meets a preset requirement includes:

determining a number of routes in the optimized cleaning route, wherein the routes refer to a set of edges connecting a plurality of nodes consecutively in the area planning diagram;

determining whether the number of the routes is less than a first preset threshold;

in response to a determination that the number of the routes is less than the first preset threshold, determining that the optimized cleaning route meets the preset requirement; or determining whether a number of the edges is less than a second preset threshold; and in response to a determination that the number of the edges is less than the second preset threshold, determining that the optimized cleaning route meets the preset requirement.

10. The method of claim 8, wherein the obtaining an optimized cleaning route by optimizing the preliminary planning route based on a preset optimization algorithm includes:

updating an edge score in each piece of edge information according to a preset rule;

removing the edge whose updated edge score is less than a preset threshold in the area planning diagram; and determining the optimized cleaning route according to the updated edges and the updated edge scores in the area planning diagram.

11. An Internet of Things system for managing a cleaning route in a smart city, including a management platform, a sensor network platform, and an object platform, wherein the object platform is configured to obtain target information of a target area within the preset time period, wherein the target information includes at least one of road monitoring information, weather information, and sidewalk tree information;

the sensor network platform is configured to send the target information of the target area to the management platform;

the management platform is configured to determine a cleaning route of the target area by processing the target information of the target area, wherein the management platform is further configured to:

determine an estimated amount of fallen leaves of each section of road in the target area according to the target information;

determine an estimated falling range of fallen leaves of each section of road in the target area according to the target information and the estimated amount of fallen leaves;

determine a cleaning difficulty evaluation value of each section of road based on the estimated amount of fallen leaves and the estimated falling range of each section of the road; and determine the cleaning route based on the cleaning difficulty evaluation value of each section of road.

12. The system of claim 11, wherein the sensor network platform includes a plurality of sensor network sub-platforms corresponding to various target areas in a city, and the management platform includes a plurality of management sub-platforms corresponding to various target areas in the city;

each sensor network sub-platform in the plurality of sensor network sub-platforms is configured to send a target information obtaining instruction of a target area to the object platform, obtain target information of the target area within a preset time period through the object platform, and send the target information to a management sub-platform corresponding to the target area; and each management sub-platform of the plurality of management sub-platforms is configured to process the target information of the target area to determine the cleaning route of the target area.

13. The system of claim 12, wherein the Internet of Things system for managing the cleaning route in the smart city further comprises a service platform and a user platform, the service platform includes a plurality of service sub-platforms corresponding to all the management sub-platforms and a general database for summarizing and processing data of the plurality of service sub-platforms;

each management sub-platform in the plurality of management sub-platforms is further configured to send the cleaning route of the target area to a service sub-platform corresponding to the management sub-platform;

each service sub-platform of the plurality of service sub-platforms is configured to receive the cleaning route of the target area sent by the management sub-platform, and summarize the cleaning route of the target area into the general database; and the general database is configured to summarize the cleaning route of each target area in the city to obtain the cleaning route of the city, and send the cleaning route to the user platform.

14. The system of claim 11, wherein the object platform is further configured to:

determine a sidewalk tree image based on the road monitoring information; and determine the sidewalk tree information by processing the sidewalk tree image based on an image recognition model, wherein the image recognition model is a machine learning model.

15. The system of claim 11, wherein the management platform is further configured to:

determine an amount of fallen leaves of each section of road in the target area by processing the target information based on an estimation model for an amount of fallen leaves, wherein the estimation model for the amount of fallen leaves is a machine learning model.

16. The system of claim 11, wherein the management platform is further configured to:

determine an estimated range of fallen leaves of each section of road in the target area by processing the target information and the estimated amount of fallen leaves based on a range estimation model, wherein the range estimation model is a machine learning model.

17. The system of claim 11, wherein the management platform is further configured to:

determine a preliminary planning route based on the cleaning difficulty evaluation value of each section of road;

obtain an optimized cleaning route by optimizing the preliminary planning route based on a preset optimization algorithm;

determine whether the optimized cleaning route meets a preset requirement;

in response to a determination that the optimized cleaning route meets the preset requirement, use the optimized cleaning route as a final cleaning route; and in response to a determination that the optimized cleaning route does not meet the preset requirement, optimize the optimized cleaning route again based on the preset optimization algorithm.

18. The system of claim 17, wherein the management platform is further configured to:

obtain basic road information of each section of road and traffic conditions between sections of road;

determine a unified cleaning score between the sections of road according to the traffic conditions between the sections of road and the cleaning difficulty evaluation value of each section of the road; and determine the preliminary planning route by constructing an area planning diagram according to the basic road information and the cleaning difficulty evaluation value of each section of road and the unified cleaning score between the sections of the road, including determining each node of the area planning diagram according to the basic road information and the cleaning difficulty evaluation value of each section of road;

constructing edges between the corresponding nodes in the area planning diagram according to a connection relationship between the sections of road;

using the unified cleaning score between the sections of road as an edge score of a corresponding edge; and determining the preliminary planning route according to the edges in the area planning diagram and the corresponding edge scores.

19. The system of claim 18, wherein the management platform is further configured to:

determine a number of routes in the optimized cleaning route, wherein the routes refer to a set of edges connecting a plurality of nodes consecutively in the area planning diagram;

determine whether the number of the routes is less than a first preset threshold;

in response to a determination that the number of the routes is less than the first preset threshold, determine that the optimized cleaning route meets the preset requirement; or determine whether the number of the edges is less than a second preset threshold; and in response to a determination that the number of the edges is less than the second preset threshold, determine that the optimized cleaning route meets the preset requirement.

20. A non-transitory computer readable storage medium, wherein the storage medium stores computer instructions, and when the computer instructions are executed by a processor, the method of claim 1 is implemented.

* * * * *